United States Patent [19]
DeAngelis et al.

[11] Patent Number: 5,537,511
[45] Date of Patent: Jul. 16, 1996

[54] NEURAL NETWORK BASED DATA FUSION SYSTEM FOR SOURCE LOCALIZATION

[75] Inventors: Christopher M. DeAngelis, Cranston, R.I.; Robert W. Green, Harwich, Mass.

[73] Assignee: The United States of America as represented by the Secretary of the Navy, Washington, D.C.

[21] Appl. No.: 324,641

[22] Filed: Oct. 18, 1994

[51] Int. Cl.⁶ .............................. G06E 1/00; G01S 3/80; G06K 9/00
[52] U.S. Cl. ........................ 395/22; 382/103; 382/106; 382/107; 367/124; 367/127; 367/129; 367/907
[58] Field of Search ....................... 395/22, 21; 382/103, 382/106, 107; 367/124, 127, 129, 907

[56] References Cited

U.S. PATENT DOCUMENTS

| | | | |
|---|---|---|---|
| 4,965,732 | 10/1990 | Roy, III et al. | 364/460 |
| 4,995,088 | 2/1991 | Farhat | 382/15 |
| 5,036,498 | 6/1991 | Van Cappel | 367/125 |
| 5,210,798 | 5/1993 | Ekchian et al. | 382/14 |
| 5,214,744 | 5/1993 | Schweizer et al. | 395/21 |
| 5,247,584 | 9/1993 | Krogmann | 382/14 |
| 5,276,770 | 1/1994 | Castelaz | 395/223 |
| 5,283,839 | 2/1994 | Edelman et al. | 382/15 |

OTHER PUBLICATIONS

DeAngelis, and Green, "Constructing Neural Networks for Contact tracking," Proc. 1992 IEEE-SP Workshop, Aug. 31–Sep. 2, pp. 560–569.

*Primary Examiner*—Robert W. Downs
*Assistant Examiner*—A. Katbab
*Attorney, Agent, or Firm*—Michael J. McGowan; Prithvi C. Lall; Michael F. Oglo

[57] ABSTRACT

A method is described for providing an estimate of the state of a moving contact. The method comprises providing a device for estimating the state of the contact, inputting information about a location of an observer platform at particular time intervals and information from at least one sensor about a position of the moving contact relative to the observer platform at each time interval into the device, transforming the inputted information into a series of geographical grids with one grid being formed for each reading of the at least one sensor; combining grids corresponding to similar time intervals into a series of consolidated grid representations; and analyzing the series of consolidated grid representations to produce an estimate of the state of the contact at a final point in time where an observation was made. The device of the present invention includes a grid stimulation block for forming the geographical grids, a fusion block for forming the consolidated grid representations, a correlation block for providing a path likelihood vector, and an estimation block for providing the desired estimate.

13 Claims, 3 Drawing Sheets

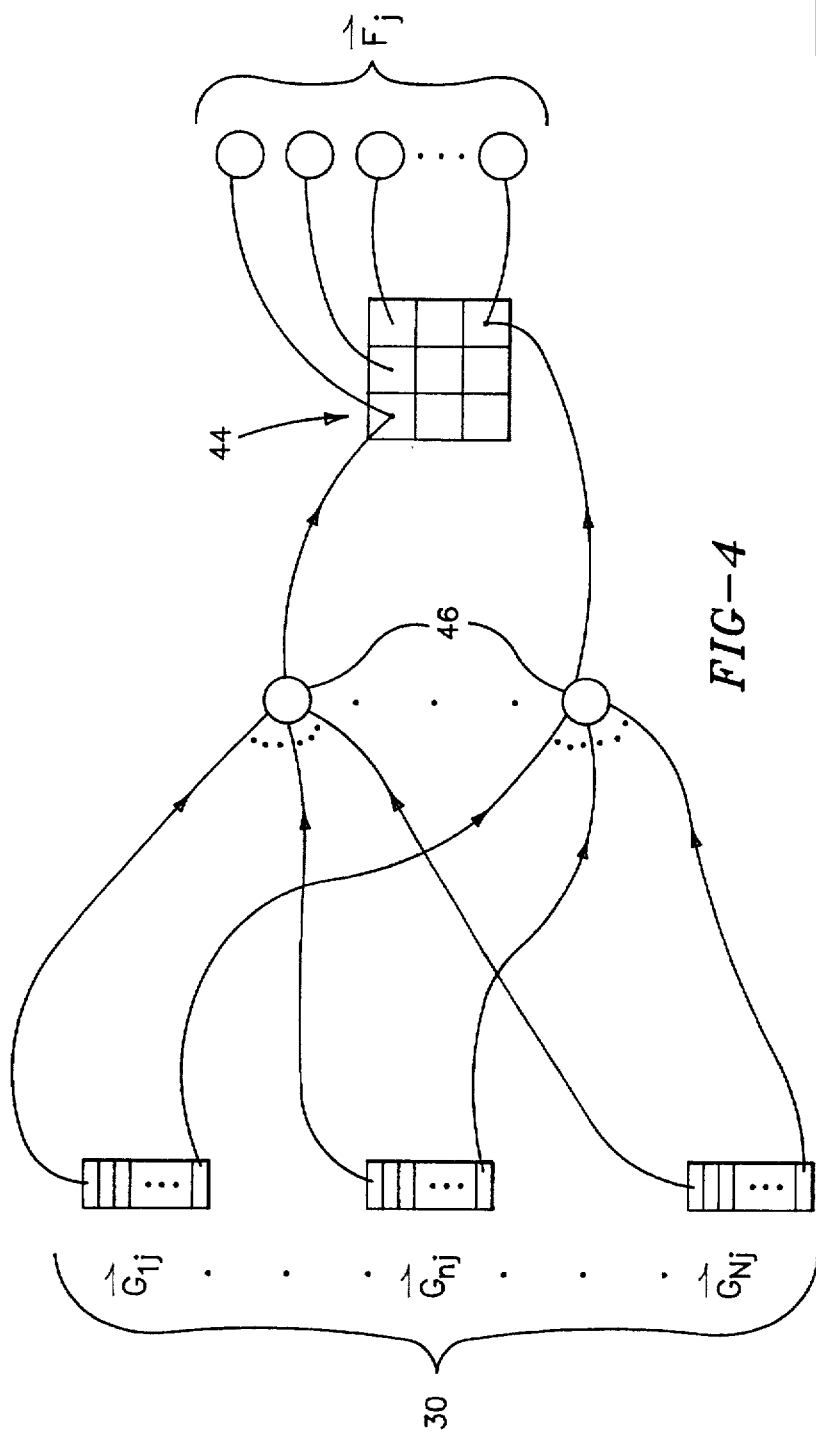
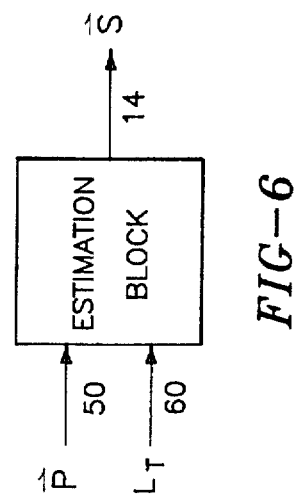
FIG-6
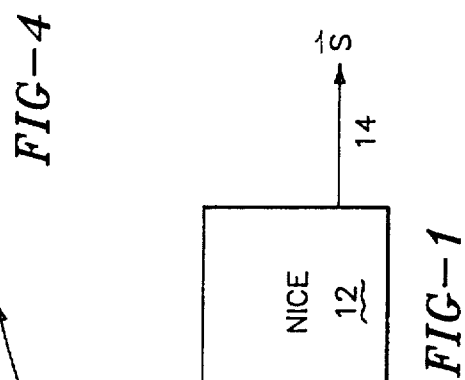
FIG-4
FIG-1

NEURAL NETWORK BASED DATA FUSION SYSTEM FOR SOURCE LOCALIZATION

STATEMENT OF GOVERNMENT INTEREST

The invention described herein may be manufactured and used by or for the Government of the United States of America for governmental purposes without the payment of any royalties thereon or therefor.

CROSS REFERENCE TO RELATED APPLICATION

The instant application is related to co-pending patent application entitled NEURAL NETWORK BASED THREE DIMENSIONAL OCEAN MODELER by Co-inventor Christopher M. DeAngelis and further identified by Navy Case No. 75024, now U.S. Pat. No. 5,488,589.

BACKGROUND OF THE INVENTION (1) Field of the Invention

The present invention relates to a method for providing an estimate of the position, speed, and direction of travel of a contact or target and a system for performing said method.

(2) Description of the Prior Art

A variety of different devices and methods have been used in the prior art to estimate various physical states using sensor information. U.S. Pat. No. 4,965,732 to Roy III et al., for example, illustrates a method and apparatus for signal reception and parameter estimation which may be used for frequency estimation and filtering, array data processing and the like. The Roy III et al. invention is applicable in the context of array data processing to a number of areas including cellular mobile communications, space antennas, sonobuoys, towed arrays of acoustic sensors, and structural analysis.

The method set forth in the Roy III patent comprises the steps of: (a) providing an array of at least one group of a plurality of signal sensor pairs, the sensors in each pair being identical and the displacement between sensors of each pair in a group being equal, thereby defining two subarrays; (b) obtaining signal measurements with the signal array so configured; (c) processing the signal measurements from the towed subarrays to identify the number of sources and estimate parameters thereof, including identifying eigenvalues from which source number and parameter estimates are based; (d) solving the signal copy problem and determining array response (direction) vector using the generalized eigenvectors; and (e) estimating the array geometry from the array response vectors.

The Roy III apparatus includes an array of at least one group of a plurality of signal sensor pairs for generating signals, the sensors in each pair being identical and the displacement between sensors of each pair in a group being equal, thereby defining two subarrays, and signal processing means for processing the signals from the two subarrays to identify the number of sources and estimate parameters thereof.

Another area where this type of technology has been employed is underwater tracking systems. U.S. Pat. Nos. 5,033,034 to Paradise and 5,036,498 to Van Cappel illustrate two such systems.

The Paradise patent relates to an apparatus located aboard a platform situated in an acoustic environment, such as a submarine, for tracking a moving body, such as a torpedo, when the body is proximate to the platform. The apparatus includes a number of acoustic sensor elements at selected locations around the platform. Each of the sensor elements detects acoustic information arriving at its selected location. The apparatus further includes signal conditioners coupled to the sensor elements with a given one of the signal conditioners providing a conditioned signal representing acoustic information which is emitted by the moving body when the body is proximate to the platform, and which arrives at the location of the acoustic sensor element to which the given signal conditioner is coupled. A processor receives conditioned signals from respective signal conditioners and enables comparisons of selected characteristics of the received signals to the made in order to determine a selected parameter which is related to the movement of the body when the moving body is proximate to the platform.

The Van Cappel patent relates to a method for determining the motion of a target in underwater acoustics by means of an antenna with misaligned sensors provided with a central sensor. The method estimates the characteristics of the velocity and position of the target relative to the antenna by means of a likelihood maximum estimator which takes into account the differences in propagation times measured between the wave fronts transmitted by the target and reaching the sensors. The motion estimator is initialized by means of an initial state vector determined on the basis of the values of the azimuths of the target perceived from the mid-points of each pair of sensors, during a determined number of measurements staggered in time. The action of the state vector takes place in taking account of the value of the elevation of the target with respect to the antenna.

In recent years, computer based technology has advanced to the point where artificial systems have been developed which simulate the operation of the human brain. These systems are known as neural networks. Typically, the systems use numerous nonlinear computational elements operating in parallel and arranged in patterns reminiscent of biological neural networks. Each computational element or neuron is connected via weights or synapses that are adapted during training to improve performance. Many of these systems exhibit self-learning by changing their synaptic weights until the correct output is achieved in response to a particular input. As a consequence, these systems have lent themselves to use in a number of different applications.

One such application is target imaging and identification systems. U.S. Pat. No. 4,995,088 to Farhat illustrates a data analysis system for such an application. Farhat's data analysis system comprises a first array for receiving input data comprising a plurality of neural elements for transmitting data signals and memory means for processing the data signals transmitted by the elements of the first array. The memory means has associatively stored therein in accordance with a Hebbian model of learning for neural networks, at least one quantized feature space classifier of a known data set. The system further comprises a second array having a plurality of neural elements for receiving the data signals processed by the memory matrix. The neural elements of the second array are operatively coupled in feedback with the neural elements of the first array wherein the neural elements of the second array provide feedback input for the neural elements of the first array. In a preferred embodiment of the Farhat system, the neural elements of the first array comprise light emitting elements and the neural elements of the second array photo-detectors.

The general contact state estimation, or target motion analysis, problem is to estimate contact location and motion from available sensor readings. These sensors may, or may not be associated with a single observation platform. Applicants have found that in either case a data fusion technique must be employed in order to exploit the available data in ascertaining a contact's state.

In a broad sense, each sensor reading provides constraints on the contact state. For example, a line-of-sight bearing reading of 305 degrees at time 0700 constrains the contact to be somewhere on a line northwest from the observer's location at 0700. If sufficient observations are available, and if assumptions are made about the contact motion (such as constant speed and heading), then the contact state may be constrained to a single solution. In this case, the contact state is said to be observable. A great deal of work has been done in determining the circumstances under which various aspects of contact state are observable; the important point here is that contact state estimation is a constraint problem.

Due to uncertainty, or error, associated with physical sensor readings, contact state determination is indeed a parameter estimation problem. Even though the contact state may be fully observable, noisy sensor readings will preclude an exact solution (truth) for a contact state. A method must be employed to determine the most likely estimate of the contact state. Typically, mathematical estimation techniques such as least squares or maximum likelihood are employed, based on some measure of compliance between actual observations and hypothesis-predicted observations. A related issue is solution sensitivity. Given that the observations are noisy, which non-optimal contact state solutions are above a certain degree of likelihood? Furthermore, are the almost-optimal solutions tightly or loosely clustered in the contact state space?

The major disadvantages associated with current methods are their significant computational demands, difficulties with solution sensitivity assessment, and fusion of multiple sensor information.

SUMMARY OF THE INVENTION

It is therefore an object of the present invention to provide an improved method for providing an estimate of the state of a contact or target.

It is a further object of the present invention to provide a method as above which yields improvements in execution speed, assessment of solution sensitivity and sensor fusion.

A still further object of the present invention is to provide a system for performing the above method.

The foregoing objects and advantages are attained by the method and apparatus of the present invention. The method of the present invention for providing an estimate of the state of a moving contact broadly comprises the steps of: providing a device for estimating the state of the contact; inputting into said device information about a location of an observer platform at particular time intervals and information from at least one sensor about a position of the moving contact relative to the observer platform at each of the time intervals; transforming the inputted information into a series of geographical grids with one grid being formed for each reading from at least one sensor; combining grids corresponding to similar time intervals into a series of consolidated grid representations; and analyzing the series of consolidated grid representations to produce an estimate of the state of the contact at a final point in time where an observation was made. The analyzing step comprises applying a constant speed and course constraint for contact motion to the series of consolidated grid representations and producing a path likelihood vector containing a likelihood measure for each possible contact path and transforming the path likelihood vector to the estimate of the state of the contact.

The system for performing the method of the present invention includes means for transforming information about a location of an observer platform at particular points in time and about a relative position between the observer platform and the contact at the particular points in time into a series of geographical grids, means for combining those geographical grids corresponding to similar time intervals into a series of consolidated grid representations, and means for analyzing the series of consolidated grid representations to produce an estimate of the state of the contact at the final point in time where an observation was made. Preferably, the system comprises a computer suitably configured and programmed to receive the aforementioned inputs and to perform the desired analysis. In a preferred embodiment, the system is formed by a programmed computer having an information processing engine including a grid stimulation block, an information fusion block, a correlation block and an estimation block.

Other objects and advantages of the method and system of the present invention will become more apparent from the following description and drawings wherein like reference numerals depict like elements.

BRIEF DESCRIPTION OF THE DRAWINGS

FIG. 1 is a schematic representation of the system of the present invention;

FIG. 4 is a schematic representation of the information fusion block in FIG. 2;

FIG. 6 is a schematic representation of the estimation block in FIG. 2; and

DESCRIPTION OF THE PREFERRED EMBODIMENT

Figure 2:
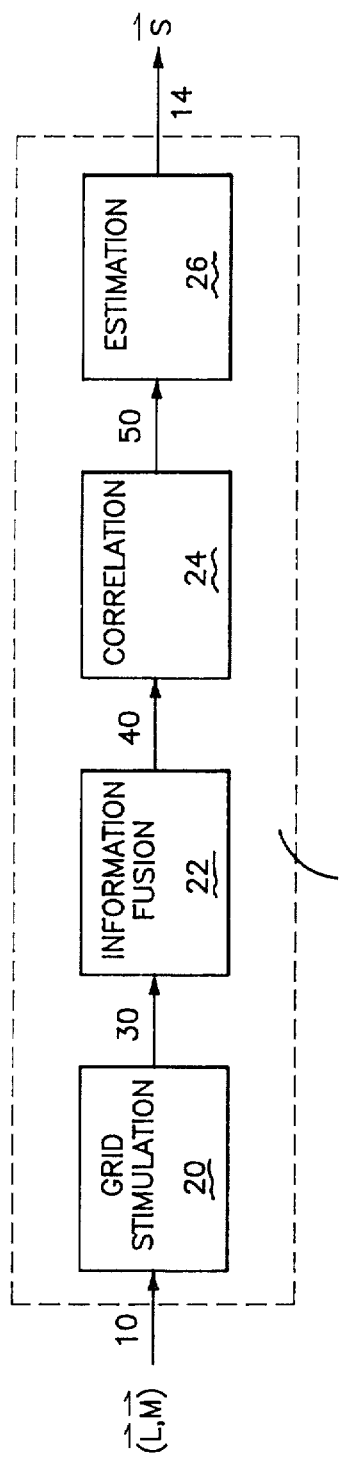
FIG. 2 is a block diagram of the system illustrating the various functional blocks within the device for providing the estimated contact state.

Referring now to the drawings, FIG. 1 is a schematic representation of the contact state estimation system 12 of the present invention for providing an estimate of the state of a moving contact, such as an ocean going body, relative to an observer on a platform. In a preferred embodiment, the system 12 is formed by a Neurally Inspired Contact Estimator (NICE) device. The current inventors provide a detailed description of the NICE architecture in papers authored by them entitled, "An Architected Neural Network For Contact State Estimation", *IEEE Proceedings of OCEANS* 92, vol. 1, pp. 153–157, and "Constructing Neural Networks For Contact Tracking", *Neural Networks For Signal Processing-Proceedings of the* 1992 *IEEE Workshop.*

The arrow 10 shown in FIG. 1 represents the inputs to the estimator system device 12 of the present invention. The inputs are a location vector $\vec{L}$, which is the physical location of an observer platform, such as a ship, a land observer, etc., at particular points in time, and a measurement vector $\vec{M}$, produced by at least one sensor (not shown) such as sonar, radar, binoculars, telescopes, etc., for providing information about the location of a contact, i.e a bearing angle, angle of arrival measurement, etc., at the same points in time. If desired, the sensor(s) may be positioned on the observer platform. The location vector $\vec{L}$ and the measurement vector $\vec{M}$ provide information that may be inputted into the device 12 using any suitable means known in the art.

The location vector $\vec{L}$ is in fact the collection of the locations of the observer over a particular time period having intervals 1 to T. The location vector may be inputted in the form of any desired coordinate scheme. For example, it may be inputted in terms of longitude and latitude or alternatively as X-, Y-, and Z-rectangular coordinates.

The vector $\vec{M}$ is the collection of the measurements over the same period of time. It too may be inputted using any desired coordinate scheme. Preferably, both vectors $\vec{L}$ and $\vec{M}$ are inputted using the same coordinate scheme.

The estimator system device 12 estimates an output 14 which is a contact state vector $\vec{S}$, containing the contact state with respect to the observer's location at the end of the time sequence. Typically, the contact state consists of: bearing from observer to contact, range from observer to contact, contact course, contact speed, or the like.

FIG. 2 shows the four major functional blocks in the device 12. The stimulation block 20 transforms the location and measurement vectors 10 into a series of geographical grid representation vectors indicated by the arrow 30. Preferably, one geographical grid representation vector is formed for each sensor reading. The grid representation vectors 30 correspond to geographical grids each having a plurality of cells which are stimulated in proportion to the likelihood of the contact's presence within the cell.

After the grid representation vectors 30 are formed for each sensor measurement, information fusion is performed in the block 22 to combine grid representation vectors corresponding to similar time intervals into a series of consolidated grid representations indicated by arrow 40. As used herein, the phrase "time interval" may mean a single point in time or a range of time values. A single consolidated grid representation is representative of information available from all sensors for a respective time interval or time plane. Constant-speed-and-course constraints for contact motion are applied to the consolidated grid representations 40 in the correlation block 24. The correlation block 24 produces a path likelihood vector indicated by arrow 50 containing a likelihood measure for each possible contact path. A possible contact path is defined as one from a geographical cell center in the first time plane to a cell center in the last time plane.

Finally, the device 12 has an estimation block 26 which transforms the path likelihood vector 50 to an estimate 14 of the contact state. FIGS. 3–6 present a more detailed description of the functional blocks.

Figure 3:
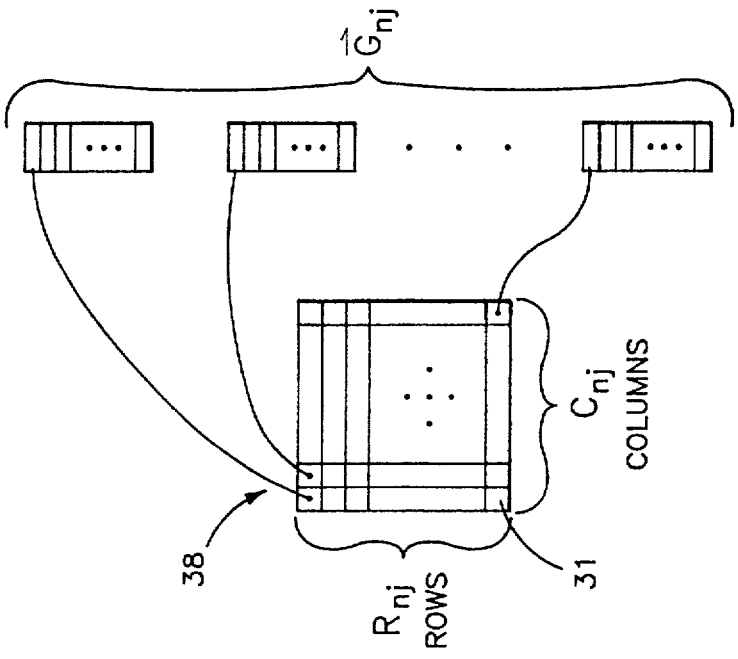
FIG. 3 is a schematic representation of the grid stimulation block in FIG. 2.
Figure 3:
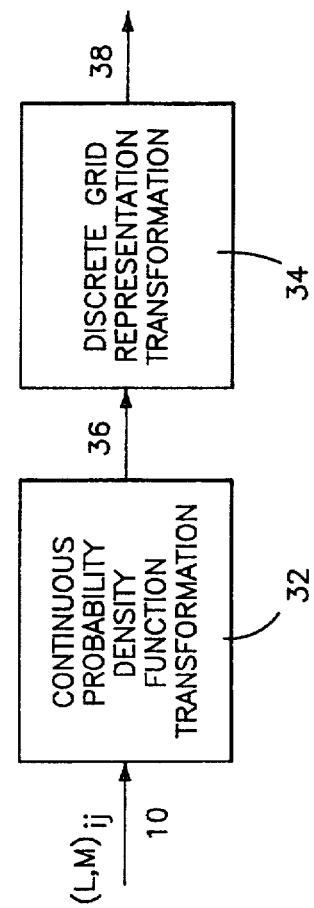

The grid stimulation block 20 depicted in FIG. 3 transforms the location $\vec{L}$ and measurement $\vec{M}$ vectors into a series of geographical grids 38 having a matrix of cells. This transformation is performed in two stages. First, pairs of sensor observation and location information for a given point in time or time interval are formed. Then each observation and location pair is transformed in the block 32 into a continuous probability density function 36 representing the likelihood of the contact's location for the respective time interval. For example, if the sensor gave a line-of-sight bearing from the observer to the contact, and if the observation were extremely accurate, then the probability density function could be expressed as "1" on a straight line away from the observer at the observed bearing angle, and "0" elsewhere. Standard mathematical techniques are employed to effect this transformation.

After all of the continuous probability density functions 36 are determined, they are transformed in the block 34 into discrete values corresponding to stimulation levels for the cells in the geographical grids 38. In essence, the continuous probability over a cell's area is converted to produce a single representative probability for the cell. Again, standard mathematical techniques known in the art are employed to carry out this transformation and to stimulate the cells. A grid's cells are stimulated in proportion to the likelihood of the contact's presence within the cells. To simplify this process, stimulations may be thresholded to a value of either "0" to "1". For example, the likelihood that the contact is in a particular cell may be 0.55. A controller such as a portion of a program in a computer for performing the method of the present invention may threshold this by raising the value to "1", thereby stimulating the cell. Alternatively, the likelihood that the contact is in a particular cell may be 0.40 and the controller may threshold this to a value of "0".

Each geographical grid 38 may have any desired number of rows and any desired number of columns defining the matrix of cells 31. As shown in FIG. 3, the geographical grid may have $R_{nj}$ rows and $C_{nj}$ columns where n is the sensor index and j is the time interval index.

Each geographical grid 38 may be represented as a linear vector. The output 30 of the grid stimulation block 20 is the series of grid representation vector $\vec{G}_{11} \ldots \vec{G}_{NM_n}$ where N is the number of sensors and Mn is the number of measurements for a respective sensor n. The number of measurements Mn for a sensor may be equal to or less than the number of time intervals T. If desired, each grid may have a different dimension that can be correlated to the resolution of the sensor or confidence in the measurement.

FIG. 4 illustrates the information fusion block 22. In this block the geographical grid representation vectors $\vec{G}_{1j} \ldots \vec{G}_{Nj}$ corresponding to equivalent time intervals are combined to form a fused grid 44 representative of information in the interval. Each fused geographical grid 44 can be represented as a linear vector $\vec{F}_j$ where j is the time interval index. The compilation of these vectors is the output 40 of the block 22. The block 22 consists of a series of artificial neurons 46 that combine like-regions from each sensor's grid, based upon confidence on each sensor.

The number of neurons 46 in the block 22 depends upon how much fusion is desired and upon the size of the respective grids $\vec{G}_{1j} \ldots \vec{G}_{Nj}$. If the grids 38 each have the same size, the number of neurons 46 may be equal to the number of rows in each grid multiplied by the number of columns in each grid. If the grids 38 are not the same size, then the number of neurons can be varied depending upon the degree of fusion to be performed. Alternatively, the number of neurons may be equal to the number of rows in the desired fused grid multiplied by the number of columns in the fused grid. In other words, there may be a neuron 46 for each element in vector $\vec{F}_j$.

The input to each neuron 46 is overseen by a system within the device such as preprogrammed software which logically selects which cells are connected to each neuron.

The operation of a neuron 46 may be dependent on the confidence in a particular sensor. If an operator of the system knows that the information from one sensor is better than the information from another sensor, the neuron 46 may be told to give information from this sensor greater weight than information or data from another sensor. Generally, the confidence in a particular sensor is expressed in terms of the size of the geographical grid for that sensor. If there is great confidence, i.e. the operator believes that the information is extremely correct, in one sensor, than there may be a lot of cells in the geographical grid 38. If there is little confidence in a sensor, then there may be fewer cells in the grid representing that sensor. The connections between the grids and the neurons may also reflect the confidence in a particular sensor.

Figure 5:
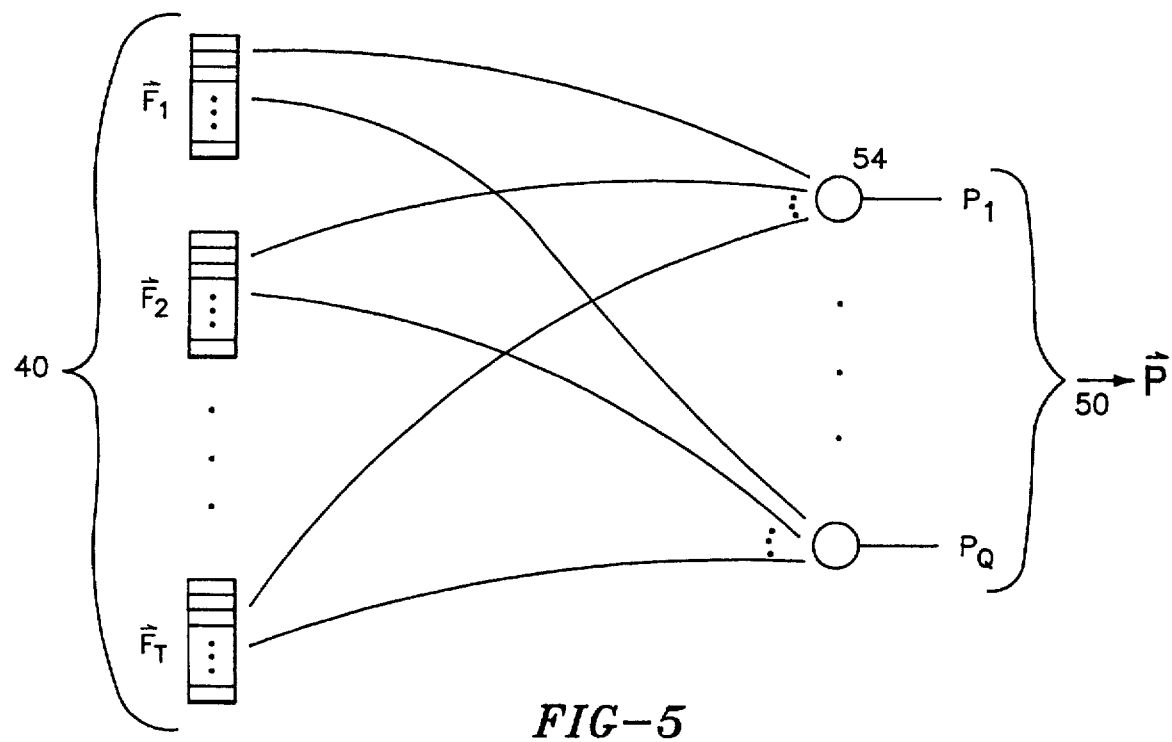
FIG. 5 is a schematic representation of the correlation block in FIG. 2.

The correlation block 24 is described in FIG. 5. It consists of a series of artificial neurons 54 that compute a measure of the likelihood that a particular path was taken by the contact. The number of neurons 54 in general depends on the size of the fused grids. If all the fused grids have the same size, then the number Q of neurons 54 may be equal to the square of the number of rows in a fused grid multiplied by the square of the number of columns in a fused grid. If all the fused grids do not have the same size, then the number of neurons may be varied to reflect the size of a particular fused grid or even the size of one or more of the geographical grids 38.

The set of paths 50 is comprised of all possible paths between geographical cell centers starting in a grid corresponding to the first observation time and ending in a grid corresponding to the last observation time. Each neuron 54 corresponds to a particular path and has one input from each fused grid vector $\vec{F}_j$. For example, a first neuron may represent a ship travelling north at speed 1, a second neuron may represent a ship travelling north at speed 2, a third neuron may represent a ship travelling east at speed 1, etc.

Each input to the neurons 54 is from the vector entry which corresponds to the geographical cell containing the location of the contact at the time of the observation, assuming the contact was on the given path. Each input takes into account the constraint that the target is moving at a constant speed and at a constant heading. Each neuron thus acts as an evidential combiner. Its inputs represent compliance between a hypothesized contact path and the sensor observations at specific times. Its output represents the overall path likelihood. The output 50 of the correlation block is the vector $\vec{P}$ of path likelihoods $P_1$ to $P_Q$. The computer forming the device 12 has means, such as preprogrammed software, for selecting which inputs are connected to which neurons 54.

The correlation block neurons 54 may be structured such that the path likelihood is represented by the number "1" if there is a valid or hot contact, i.e. an indication that the contact is present in every cell fed into that particular neuron, and a potential solution and represented by the number "0" if there is no valid contact. For any given set of correlation neurons, there may be one or more neurons stimulated to produce an output of "1".

FIG. 6 illustrates the estimation block 26. Its inputs are the path likelihood vector 50 produced by the correlation block and the observer location $L_T$ at the final observation time. The function of the block is to transform the path likelihood vector 50 into an estimate output 14 of the contact state at the final observation time using standard mathematical averaging techniques. In operation, a significant number of contact paths may have non-zero likelihood, and a single contact state estimate needs to be extracted. Estimate output 14 may consist of contact state vector $\vec{S}$ containing contact bearing, range, cruise speed, or the like, estimates.

Figure 7:
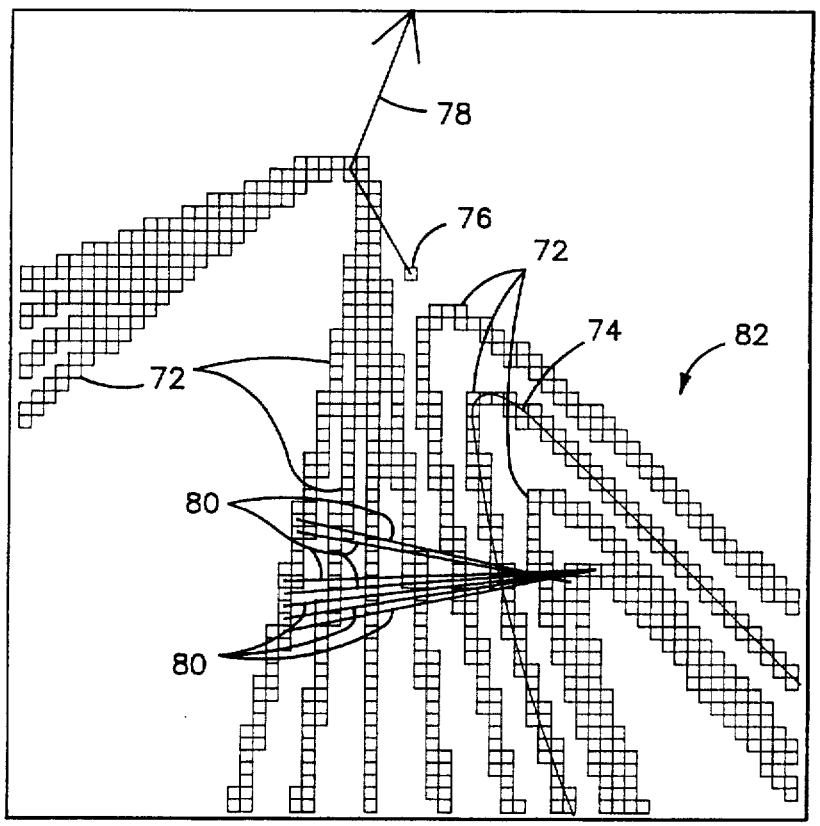
FIG. 7 illustrates an output display from the system of the present invention comprising a grid representation showing active grid cells.

FIG. 7 is an example of a type of output possible from the system of the present invention. It illustrates a superposition of geographical grids with stimulated cells indicated by boxes 72. The stimulated cells 72 for each geographical grid conform to a sensor having a probability density function in the shape of a hyperbole as illustrated by line 74. The number of hyperbolas corresponds to the number of sensor measurements for the time period illustrated. The observer location at the beginning of the time period is indicated by box 76 and the observer path over the time period is indicated by arrow 78. The contact trajectories 80 correspond to paths having the highest likelihoods for the sensor measurements shown.

Although the system of the present invention may be implemented in hardware, i.e. electronic components assembled together, a software implementation is preferred due to the number of cells and connections, and the limitations of current VLSI circuit densities. To effectively represent this system on a small computer, a number of simplifying design and implementation decisions were made.

Implementation of the system may involve the processing of observations from passive sonar devices. Therefore, each observation may result in a locus of points known hereafter as bearing lines. These bearing lines may not be restricted to being straight lines. For example, measurements taken from a certain sensor array may result in a hyperbolic locus as illustrated in FIG. 7.

To simplify the implementation, only those grid cells traversed by a bearing line are marked. The only exception to this rule is that if a bearing line is near a grid cell edge, the adjacent cell on that edge is also marked. This can be seen in the double cell bearing line segments 82 shown in FIG. 7. Marked cells have input values of one; all other inputs are zero. The reason for taking this simplifying approach is the desire to minimize the calculations required in the correlation layer.

In the information fusion block, the activation function of the neurons 46 can be calculated according to the degree of fusion desired. A "weak" fusion would use a Boolean OR function. This combination scheme inherently allows for partial data from numerous sensors since the evidence only needs to come from a single sensor for a fusion cell to be stimulated. At the other extreme, if a Boolean AND function is utilized, a "strong" fusion is performed since evidence must be consistent from all sensors in order to stimulate a fusion cell.

In the correlation block, there are two major concerns: the neuron processing model and the reduction of memory and CPU demands. The neuron processing mode may be simple. For example, "0" or "1" activations from the input fused grid vectors may be simply ANDed together.

To keep the demands on the computer memory and the CPU down, only a small number of paths realistically need to be evaluated. In particular, this system evaluates only those correlation neurons corresponding to paths whose (first, last) observation input cells are both active. Since the correlation neuron activation function is a Boolean AND, all other correlation neurons will be inactive anyway. The algorithm for the correlation block is simply:

for all (c1, c2) cell pairs, where c1 is a cell on the first bearing line and c2 is a cell on the last bearing line:
  1. for each intermediate bearing time t:
     a) calculate the hypothesized contact position between c1 and c2 at time t b) check the corresponding grid cell in the time t input plane; if inactive, reject the path 2. accept the path if otherwise not rejected.

Storage requirements for the correlation neurons is minimal, since only accepted neurons need to be saved. If the geographic grid resolution is N cells per side, then each grid contains $N^2$ cells. Since a contact path could begin in any one of these $N^2$ cells and end in any one, there are $N^4$ possible contact paths and hence $N^4$ correlation neurons. By accepting only paths with active grid cells, the contact paths are constrained to crossing about N cells. This results in the evaluation of about $N^2$ correlation neurons instead of the $N^4$. In an example where N=256, this reduces correlation neuron evaluations from about four billion to about 65 thousand.

The estimation block derives the best estimate for contact state from the active correlation neurons. Straight averages for range, course, speed, or the like, are calculated.

In operation, an estimate of the state of a contact is produced by inputting into the system 12 information about the location of an observer platform at particular time intervals and information from at least one sensor, preferably but not necessarily onboard the platform, about a position of the moving contact relative to the observer platform at each of the time intervals. The information is then transformed into a series of geographical grids with one grid being formed for each reading from said at least one sensor. The grids corresponding to similar time intervals are then combined into a series of consolidated or fused grid representations. The consolidated or fused grid representations are then analyzed to produce an estimate of the state of the contact at a final point in time where an observation was made. The analyzing step comprises applying a constant speed and course constraint for contact motion to the series of consolidated grid representations, producing a path likelihood vector containing a likelihood measure for each possible contact path, and transforming the path likelihood vector into said estimate. The inputted information transforming step comprises forming sensor observation and location pairs, transforming each pair into a series of continuous probability density functions with each such density function representing the likelihood of the contact's location over a respective time plane, and transforming each said density function into discrete values corresponding to stimulation levels for the cells in the geographical grids. The combining step comprises providing a first series of artificial neurons and using the neurons to combine said geographical grids at equivalent time periods into a series of fused grids wherein each of the fused grids is representative of information in a particular time interval. The path likelihood producing step comprises providing a second series of artificial neurons, inputting information from each of the fused grids into each of the neurons in the second series, and using the neurons to compute a measure of the likelihood that a particular path was taken by the contact. Finally, the path likelihood vector transforming step comprises inputting said likelihood measure and an observation location vector at the final observation point in time into a means for transforming the path likelihood measure into the estimate of said contact state at the final observation point in time.

As previously discussed, the method of the present invention is preferably carried out using a computer and software that forms each of the functional blocks. The mathematical techniques to perform the various transformations and calculations are all well known in the art.

Major advantages of the method and the system of the present invention are execution speed, an assessment of solution sensitivity, and sensor fusion.

The design of the system and the method of the present invention offer a number of attractive features. A bearing line constrains the locus of points where a contact might be at a given time. Different angle of arrival sensors merely produce different loci; all are equivalent and can be fused using the system described herein. Intermittent data can be accommodated by configuring fusion and/or correlation neurons to ignore the missing data. The geographical grid resolutions can be varied to adjust to the quality and confidence in the sensor readings. In addition, the neural network can be executed in a highly parallel manner.

The system of the present invention could also be configured to assume contact maneuvers, for example, a zigzag course with specific period, zig-angle and phase. The motion assumption results in a set of constraints used to configure the correlation layer. A multiple-hypothesis estimation system might include execution of multiple device, each corresponding to a different contact motion hypothesis. Hypotheses could be evaluated by the characteristics of the solution paths; no solution paths would indicate an unlikely hypothesis.

There are alternative techniques for implementing geographical grid marking and fusing, grid coordinate systems, and best estimate extraction methods. The major alternative to simple marking would be to assign a real-valued input to a grid cell based on how far away it was from the bearing line, in relation to the standard bearing error. Thus, large bearing measurement error and/or high grid resolution would result in a broad marking of input cells, with those nearest the observed bearing given the larger input values.

In place of the simple Boolean function model for the fusion neurons, alternative probabilistic models such as Bayesian, Dempster-Shafer, or the like could be used.

The geographical grid has been preferably implemented in rectangular coordinates. One significant alternative to this is a polar coordinate system, whereby each cell would represent a (range, angle) pair where range is distance from observer to contact, and angle is bearing to contact. Other coordinate systems, including three dimensional systems are feasible.

The estimation block has been implemented as a straight averaging of the valid contact paths found in the correlation block. Other probabilistic methods could also be employed; for example, if a real-valued grid marking was used, and real-value correlation neuron outputs provided, then a weighted averaging approach could be used.

It is apparent that there has been provided in accordance with this invention a neural network based data fusion system which fully satisfies the objects, means and advantages set forth hereinbefore. While the invention has been described in combination with specific embodiments thereof, it is evident that many alternatives, modifications and variations will be apparent to those skilled in the art in light of the foregoing description. Accordingly, it is intended to embrace all such alternatives, modifications, and variations as fall within the spirit and broad scope of the appended claims.

What is claimed is:

1. A method for providing an estimate of the state of a moving contact using a device for estimating the state of said contact, said method comprising the steps of:

inputting into said device information about a location of an observer platform at particular time intervals and information from at least one sensor about a position of a moving contact relative to said observer platform at each of said time intervals;

transforming said inputted information into a series of geographical grids with one geographical grid being formed for each reading from said at least one sensor;

combining grids corresponding to similar time intervals into a series of consolidated grid representation; and analyzing said series of consolidated grid representations to produce an estimate of the state of said contact at a final point in time where an observation was made.

2. The method of claim 1 wherein said analyzing step comprises:

applying a constant speed and course constraint for contact motion to said series of consolidated grid representations; and producing a path likelihood vector containing a likelihood measure for each possible contact path.

3. The method of claim 2 wherein said analyzing step further comprises:

combining said path likelihood vector with an observation location at said final point in time; and transforming said path likelihood vector to said estimate of the state of said contact with respect to said observation location.

4. The method of claim 1 wherein said transforming step comprises:

forming sensor observation and location pairs from said inputted information;

transforming each said sensor observation and location pair into a series of continuous probability density functions with each continuous probability density function representing the likelihood of the contact's location over a respective time plane; and transforming each said continuous probability density function into discrete values corresponding to stimulation levels for the cells in the geographical grids.

5. The method of claim 4 wherein said combining step comprises:

providing a first series of artificial neurons; and using said artificial neurons to combine said geographical grids at equivalent time periods into a series of fused grids where each one of said fused grids is representative of information in a particular time interval.

6. The method of claim 5 wherein said analyzing step comprises:

providing a second series of artificial neurons;

inputting information from each of said fused grids into each of said artificial neurons in said second series; and using said second series of artificial neurons to compute a measure of the path likelihood for each possible path taken by the contact.

7. The method of claim 6 wherein said analyzing step further comprises inputting said measures of path likelihood for each possible path taken by the contact and an observation location at said final observation point in time into a means for transforming the path likelihood measures into the estimate of said contact state at said final observation point in time.

8. A system for generating an estimate of the state of a contact at a particular point in time, said system including:

means for transforming information about a location of an observer platform at particular points in time and about a relative position between said observer platform and said contact at said points in time into a series of geographical grids;

means for combining ones of said geographical grids corresponding to similar time intervals into a series of consolidated grid representations; and means for analyzing said series of consolidated grid representations to produce an estimate of the state of said contact at a final point in time where an observation was made.

9. The system of claim 8 wherein said analyzing means comprises:

means for applying a constant speed and course constraint for contact motion to said series of consolidated grid representations;

means for producing a path likelihood vector containing a likelihood measure for each possible contact path; and means for transforming said path likelihood vector into said estimate of said state of said contact.

10. The system of claim 9 wherein said information transforming means comprises means within a computer for transforming said information.

11. The system of claim 9 wherein said combining means comprises a first series of artificial neurons connected to said geographical grids so that each neuron in said first series receives an input from each geographical grid and generates said consolidated grid representations.

12. The system of claim 11 wherein said constant speed and course constraint applying means comprises a second series of artificial neurons connected to said series of consolidated grid representations so that each neuron in said second series receives an input from each consolidated grid representation in said series and generates an output representing the likelihood of a particular path.

13. The system of claim 8 wherein:

said system comprises a computer having an information processing engine;

said transforming means comprises a grid stimulation block within said engine;

said combining means comprises an information fusion block within said engine; and said analyzing means comprises a correlation block and an estimation block within said engine.

* * * * *